April 30, 1963     G. KURTZE     3,087,569
VIBRATION-DAMPING STRUCTURE
Filed March 23, 1959     2 Sheets-Sheet 1

INVENTOR.
GUENTHER KURTZE
BY Rines and Rines
ATTORNEYS

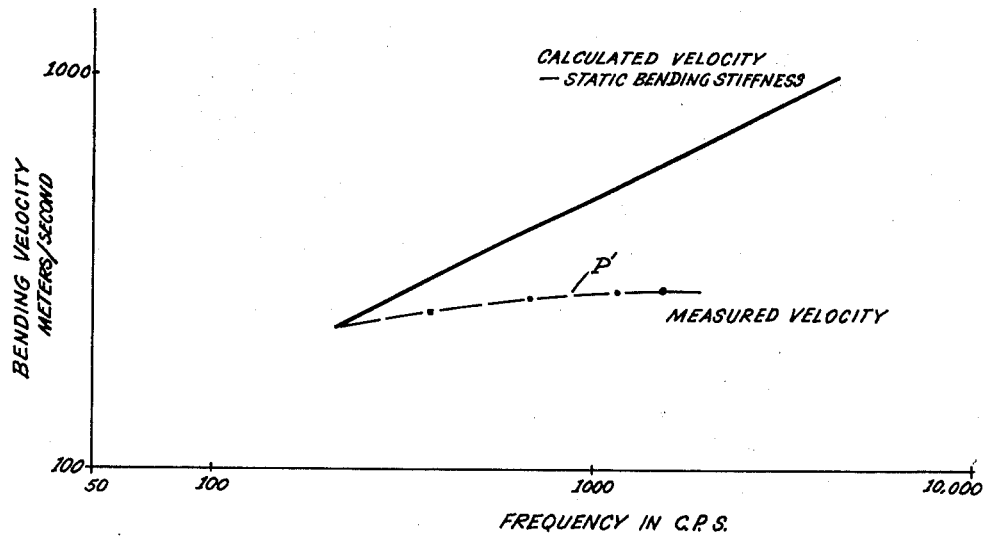
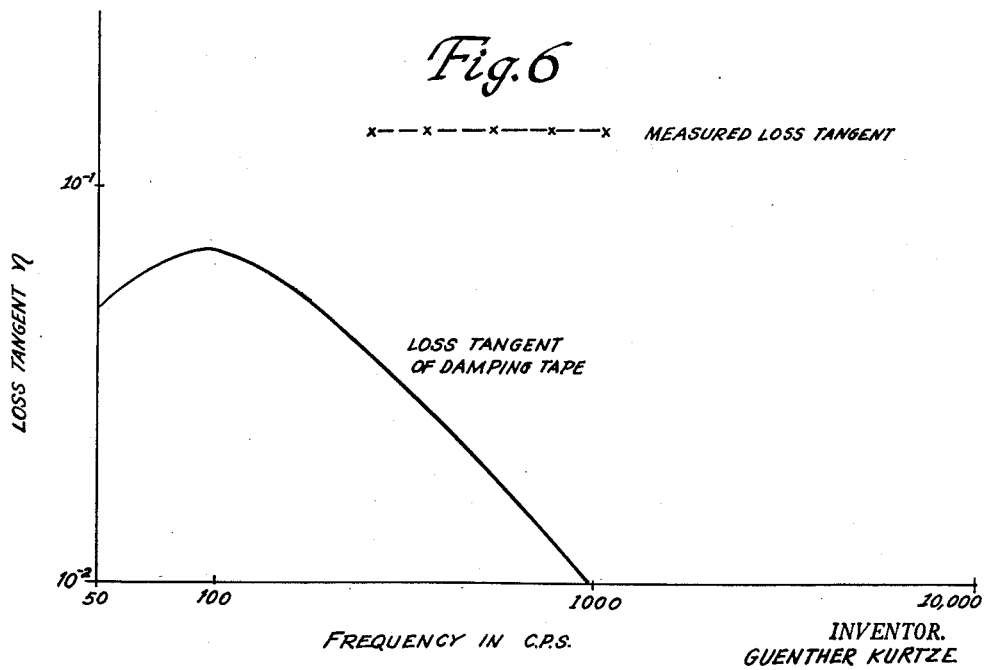

United States Patent Office 3,087,569
Patented Apr. 30, 1963

3,087,569
VIBRATION-DAMPING STRUCTURE
Guenther Kurtze, Arlington, Mass., assignor to Bolt Beranek and Newman Inc., Cambridge, Mass., a corporation of Massachusetts
Filed Mar. 23, 1959, Ser. No. 801,198
2 Claims. (Cl. 181—33)

The present invention relates to vibration-damping structures and, more particularly, to the damping of vibrations of acoustic or sound frequencies, where the terms "acoustic" and "sound" are intended generally to embrace the audible, sub-audible and super-audible ranges.

Many different types of vibration-damping structures have heretofore been proposed and employed. A stiff damping layer, for example, has been applied to one or both sides of a plate. While such a construction may yield a loss tangent which is substantially independent of frequency over a predetermined range, the loss tangent is necessarily much smaller than the loss tangent of the damping layer itself. On the other hand, a damping tape structure, comprising a comparatively thin dissipative layer sandwiched between two relatively stiff sheets, may yield a high loss tangent at a given frequency; but, this loss tangent unfortunately, is frequency selective, decreasing substantially linearly towards higher as well as towards lower frequencies, as a relaxation-type response.

An object of the present invention, accordingly, is to provide a new and improved vibration-damping structure that shall not be subject to the above-described low loss tangent or frequency selectiveness or other disadvantages of the prior art, but that shall, to the contrary, provide loss tangents considerably higher than those obtainable with stiff damping layers or coatings, and this over very broad bands of frequencies as contrasted with damping tapes and the like.

A further object is to provide a novel damping structure operating upon the principle of dissipating vibrational energy through shearing of the core between two outer panels or sheets, rather than by extension or compression thereof.

Other and further objects will be explained hereinafter and will be more particularly pointed out in the appended claims.

The invention will now be described in connection with the accompanying drawing, FIG. 1 of which is a longitudinal section of a sandwich-type panel structure subjected to extensional damping;

FIG. 5 is a further graph illustrating experimentally obtained measurements of bending velocity as a function of frequency; and FIG. 6 is a graph similar to FIG. 4 of experimentally measured loss tangents.

Figure 1:
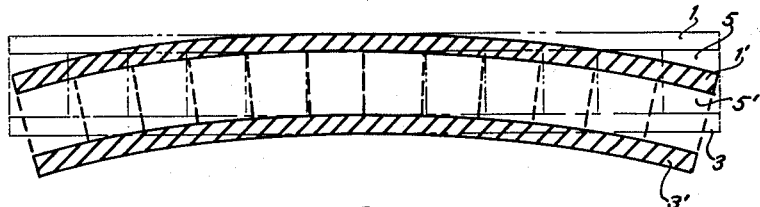

Referring to FIG. 1, an extensional type sandwich structure is illustrated in dotted lines comprising a pair of undeformed outer stiff members, generically illustrated as plates, skins, bars or surfaces 1 and 3 interconnected and separated by a spacer or core region 5. As such a structure bends in response to vibrational energy, as indicated by the solid-line positions of the plates, skins, bars or surfaces 1', 3', hereinafter all referred to as "panels," and of the spacer region or core 5', the length of the upper deformed panel 1' will become elongated from its length in the dotted position of the panel 1, and the length of the lower deformed panel 3' will become compressed from its length in the dotted position of the panel 3. As is evident from the dotted vertical lines in the spacer or core regions 5, 5', the spacer will bend arcuately between the plates 1 and 3, the upper portion of the spacer elongating and the lower portion compressing in length, thereby effecting dissipation of the vibrational energy, but subject to the disadvantageous features before-recounted.

Figure 2:
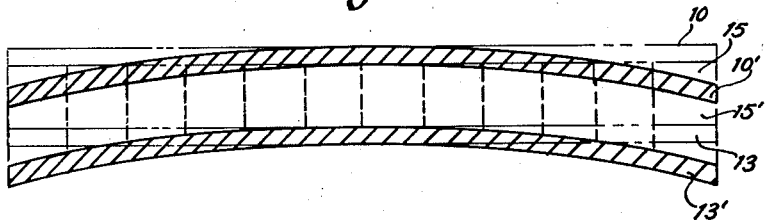
FIG. 2 is a similar view illustrating the shear damping effected in accordance with a preferred embodiment of the invention.

In accordance with the present invention, on the other hand, a sandwich construction is provided that is so dimensioned and proportioned that the structure favors shear rather than bending deformations for the frequencies of interest. In FIG. 2, accordingly, an appropriate spacer medium 15 as of thermoplastic material, such as asphalt, wax or the like, is selected having a thickness much greater than the combined thickness of the panels 10, 13 and, generally, a mass per unit that is comparable to or greater than that of the combined mass per unit area of the panels. Under such circumstances, the primary motion in response to a vibration wave is that of shearing of the core material, as indicated at 15', with the relatively thin panels 10 and 13 suffering no appreciable elongation or compression, as at 10' and 13'.

Figure 3:
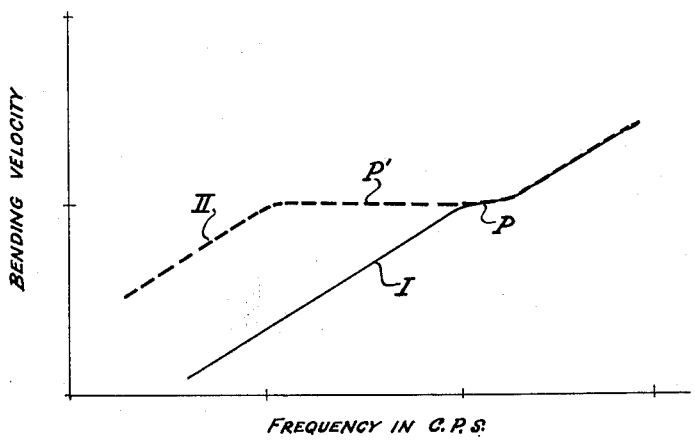
FIG. 3 is a graph demonstrating the theoretical variation of bending velocity with frequency in the structure of FIG. 2.
Figure 4:
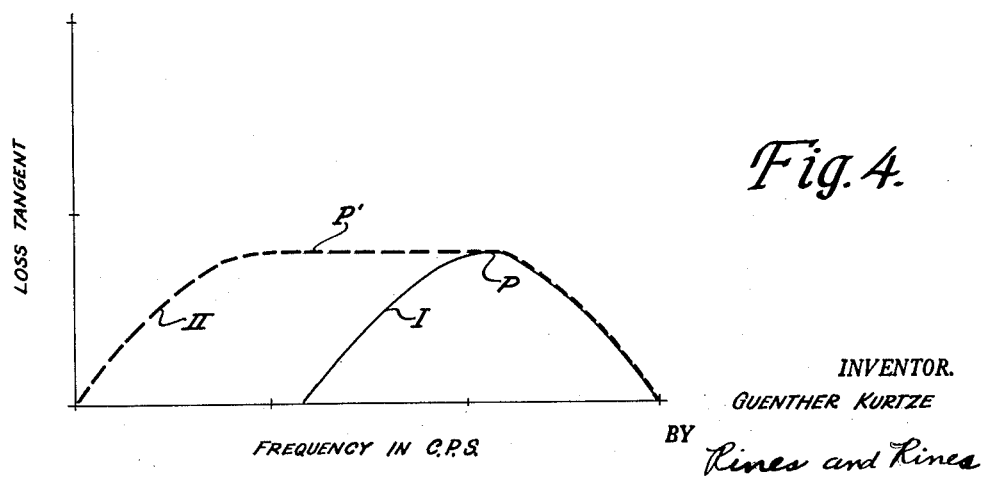
FIG. 4 is a similar graph demonstrating the theoretical variation of loss tangent with frequencies.

The transverse-wave or bending velocity versus frequency characteristic of prior panel structures, such as damping tape structures with a thin dissipative layer, is shown in the solid-line curve I, FIG. 3, having a relatively small flat region or plateau P at which the bending velocity equals that of the shear-wave velocity determined by the dissipative layer. In the case of the thick shear structure of FIG. 2, however, a modified curve II is produced, shown dotted, having a wide plateau P' over a relatively broad band of frequencies. This gives rise to modification of the before-mentioned type of frequency-selective relaxation operation, shown in the solid-line curve I of FIG. 4 and relating loss tangent to frequency. Instead, the thick shear structure of FIG. 2 provides the dotted curve II, FIG. 4, having a central flat region or plateau P', which can be extended over a very wide frequency range, as compared with the frequency selective peak P of curve I. In most cases, the decrease in curve II at the very high frequencies will not be observed, so that essentially the effectiveness is limited only at the lower frequencies.

With dissipative core materials 15, proportioned as above explained, the loss tangent of the structure 10—15—13 has been found, indeed, to be substantially equal to that of the spacer or core 15 in the frequency range within which the transverse vibration-wave velocity is substantially exclusively determined by the shear modulus $\mu$ of the core material 15. The relationship between the shear-wave velocity $c_s$ and the shear modulus $\mu$ and the mass per unit area $\rho$ of the panel structure is substantially:

$$c_s = \sqrt{\mu/\rho}$$

With this type of construction, accordingly, the damping of the panel is essentially equal to the loss tangent of the core, so that the core material is used most effectively as a damping medium.

Experimentally obtained performance characteristics are plotted in the dash-line graphs of FIGS. 5 and 6, for a pair of one-eighth inch metal panels 10, 13 of sheet steel, about one and a half inches wide, and a core layer 15 secured therebetween of comparatively hard plastic wax, about one inch thick. The curve labeled "Measured Velocity" in FIG. 5 shows the substantially constant flat or plateau region P', as contrasted in the same frequency range, with the performance or characteristic attainable with mere static bending stiffness operation. Similarly, the broad-band constant loss tangent curve "Measured Loss Tangent" contrasts with the frequency-selective type of characteristic obtainable with the before-mentioned damping tape and the like. The resulting loss tangent, averaged over the frequency range of from 200 to 2000 cycles was $\eta_w=0.128$, and was found to be almost identical with the loss tangent of the core material 15; thus indicating that the stiffness of the composite structure of FIG. 2 in this frequency range is entirely due to the shear stiffness of the core 15.

Further modifications, including substitution of panel materials and well-known vibration-dissipative core materials or constructions all proportioned and dimensioned as above explained in order to product the phenomenon of predominating shear-wave propagation, will immediately suggest themselves to those skilled in the art, and all such are considered to fall within the spirit and scope of the invention as defined in the appended claims. In the claims, the terms "wax-like" and "steel-like" are intended to embrace materials which are respectively like wax or like steel in the function performed by the designated element in the acoustic panel.

What is claimed is:

1. An acoustic panel for damping a broad range of acoustic frequencies with substantially constant damping, comprising stiff steel-like layers of sheet material spaced apart, and a core of hard wax-like material between and in contact with said layers and mechanically interconnecting said layers, the thickness of the said core being much greater than the combined thicknesses of the said layers and the mass per unit area $\rho$ of the said core being at least substantially equal to the mass per unit area of the said layers, in order that acoustic vibrations are substantially confined to shear-wave propagation in the said core at a shear-wave velocity $c_s$ related to the mass per unit area $\rho$ of the core and the shear modulus $\mu$ of the core substantially by the equation:

$$c_s=\sqrt{\mu/\rho}$$

2. An acoustic panel as claimed in claim 1, and in which the said wax-like material is a shear-deformable plastic.

References Cited in the file of this patent

UNITED STATES PATENTS

| | | |
|---|---|---|
| 1,193,013 | Grant | Aug. 1, 1916 |
| 2,017,071 | Minor | Oct. 15, 1935 |
| 2,184,482 | Austin et al. | Dec. 26, 1939 |
| 2,270,902 | Rubissow | Jan. 27, 1942 |
| 2,576,073 | Kropa et al. | Nov. 20, 1951 |
| 2,728,702 | Simon | Dec. 23, 1955 |
| 2,744,042 | Pace | May 1, 1956 |
| 2,802,240 | Thomas | Aug. 13, 1957 |

FOREIGN PATENTS

| | | |
|---|---|---|
| 533,200 | Italy | Sept. 19, 1955 |
| 1,135,422 | France | Dec. 17, 1956 |

OTHER REFERENCES

Cyril M. Harris, Handbook of Noise Control (McGraw-Hill Book Company, Inc., New York, 1957), pages 12–1, 12–2, 12–8 through 12–10 and 14–13 through 14–18.

S. Timoshenko: Vibration Problems in Engineering (D. Van Nostrand Company, Inc., New York, 1955), pages 210–220, Third edition.